US 6,690,768 B2

(12) United States Patent
Hansen

(10) Patent No.: US 6,690,768 B2
(45) Date of Patent: Feb. 10, 2004

(54) POWER CUTBACK CONFIGURATION OF DIGITAL SUBSCRIBER LINE TRANSCEIVERS USING PUBLIC SWITCHED TELEPHONE NETWORK SIGNALING

(75) Inventor: Carl Christian Hansen, Aloha, OR (US)

(73) Assignee: Intel Corporation, Santa Clara, CA (US)

(*) Notice: Subject to any disclaimer, the term of this patent is extended or adjusted under 35 U.S.C. 154(b) by 98 days.

(21) Appl. No.: 09/745,938

(22) Filed: Dec. 21, 2000

(65) Prior Publication Data

US 2002/0080933 A1 Jun. 27, 2002

(51) Int. Cl.$^7$ ............................ H04M 1/24; H04M 3/08; H04M 3/22
(52) U.S. Cl. .................. 379/1.03; 379/28; 379/29.07; 370/465; 370/480; 370/493
(58) Field of Search .................. 379/1.01, 1.03, 379/1.04, 22.02, 22.04, 23, 24, 26.02, 27.01, 27.03, 27.04, 29.01, 29.07, 31, 32.04; 370/493, 494, 495, 537, 465, 480

(56) References Cited

U.S. PATENT DOCUMENTS

| | | | | |
|---|---|---|---|---|
| 5,761,649 A | * | 6/1998 | Hill ........................... 705/27 |
| 6,014,425 A | * | 1/2000 | Bingel et al. .................. 379/27 |
| 6,061,427 A | * | 5/2000 | Ryoo ........................ 379/22.04 |
| 6,192,109 B1 | * | 2/2001 | Amrany et al. .............. 379/30 |
| 6,226,356 B1 | * | 5/2001 | Brown ......................... 379/24 |
| 6,236,714 B1 | * | 5/2001 | Zheng et al. ................ 379/1.03 |
| 6,418,196 B1 | * | 7/2002 | Brlenic et al. ............. 379/32.04 |
| 6,426,961 B1 | * | 7/2002 | Nimmagadda .............. 370/793 |
| 6,532,277 B2 | * | 3/2003 | Ulanskas et al. ......... 379/27.01 |
| 6,542,581 B2 | * | 4/2003 | Suonsivu et al. .......... 379/1.04 |

FOREIGN PATENT DOCUMENTS

| | | | | |
|---|---|---|---|---|
| JP | 01082751 A | * | 3/1989 | ............ H04M/7/00 |
| JP | 02192254 A | * | 7/1990 | ............ H04B/1/00 |
| JP | 08 251276 A | | 9/1996 | |
| WO | WO 00/52920 | | 9/2000 | |

* cited by examiner

Primary Examiner—Binh Tieu
(74) Attorney, Agent, or Firm—Blakely, Sokoloff, Taylor & Zafman LLP

(57) ABSTRACT

The invention provides a technique for power cutback of DSL transceivers (e.g., modems) using public switched telephone network (PSTN) signaling. For example, one or more dual-tone/multiple frequency (DTMF) signals generated by a touch-tone telephone, or other device, can cause a DSL transceiver to reduce the power of upstream data communications. A user of a DSL modem can cause the modem to transmit upstream data while listening to the microphone of a telephone coupled to the same twisted-pair line. Data transmission power can be adjusted by use of one or more buttons on the telephone. The DSL transceiver, in response to one or more predetermined DTMF signals, can adjust transmission power. Thus, the power cutback of the DSL transceiver can be controlled using PSTN signaling.

32 Claims, 3 Drawing Sheets

POWER CUTBACK CONFIGURATION OF DIGITAL SUBSCRIBER LINE TRANSCEIVERS USING PUBLIC SWITCHED TELEPHONE NETWORK SIGNALING

FIELD OF THE INVENTION

The invention relates to digital subscriber line (DSL) transceivers. More particularly, the invention relates to power cutback configuration of DSL transceivers using public switched telephone network (PSTN) signaling.

BACKGROUND OF THE INVENTION

DSL provides a subscriber with the ability to use a twisted-pair telephone line for both voice and data simultaneously. The frequency ranges supported by the twisted-pair line are divided into three or more bands and used for specific purposes. For example, 0–4 kHz can be used for voice communication, 30–138 kHz can be used for upstream data communications and 138+kHz can be used for downstream data communications. Upstream communications refers to data flow from the DSL modem to a service provider, while downstream communications refers to data flow from the service provider to the DSL modem. Other DSL standards also exist that use different frequency allocations.

The power levels at which DSL modems transmit upstream data must be carefully controlled so that the modem signals do not interfere with the voice communications over the twisted-pair line. Current power level configurations include providing a predetermined power cutback (e.g., 80%) for all applications of a particular modem model. These cutback levels are typically selected based on a worst case scenario basis. Providing a predetermined power cutback level for all DSL modems results in most modems operating at less than peak efficiency.

Power cutback is typically provided by one or more filters and/or gain control units. For example, the modem can include a bandpass filter that passes frequencies used for upstream communications and limit the upstream power to a fixed predetermined power level. However, such filters reduce flexibility because filters provided by a manufacturer are typically designed based on worst case scenarios. Flexibility may be provided by allowing a modem user or technician to change the filter power output, but this would require the user or technician to access the internal components of the modem, which may result in reduced efficiency or lifespan of the modem.

BRIEF DESCRIPTION OF THE DRAWINGS

The invention is illustrated by way of example, and not by way of limitation, in the figures of the accompanying drawings in which like reference numerals refer to similar elements.

DETAILED DESCRIPTION

Techniques for power cutback for digital subscriber line (DSL) transceivers are described. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

The invention provides a technique for power cutback of DSL transceivers (e.g., modems) using public switched telephone network (PSTN) signaling. For example, one or more dual-tone/multiple frequency (DTMF) signals generated by a touch-tone telephone, or other device, can cause a DSL transceiver to reduce the power of upstream data communications. A user of a DSL modem can cause the modem to transmit upstream data while listening to the microphone of a telephone coupled to the same twisted-pair line as the DSL transceiver. Data transmission power can be adjusted by use of one or more buttons on the telephone. The DSL transceiver, in response to one or more predetermined DTMF signals, can adjust transmission power. Thus, the power cutback of the DSL transceiver can be controlled using PSTN signaling.

Figure 1:
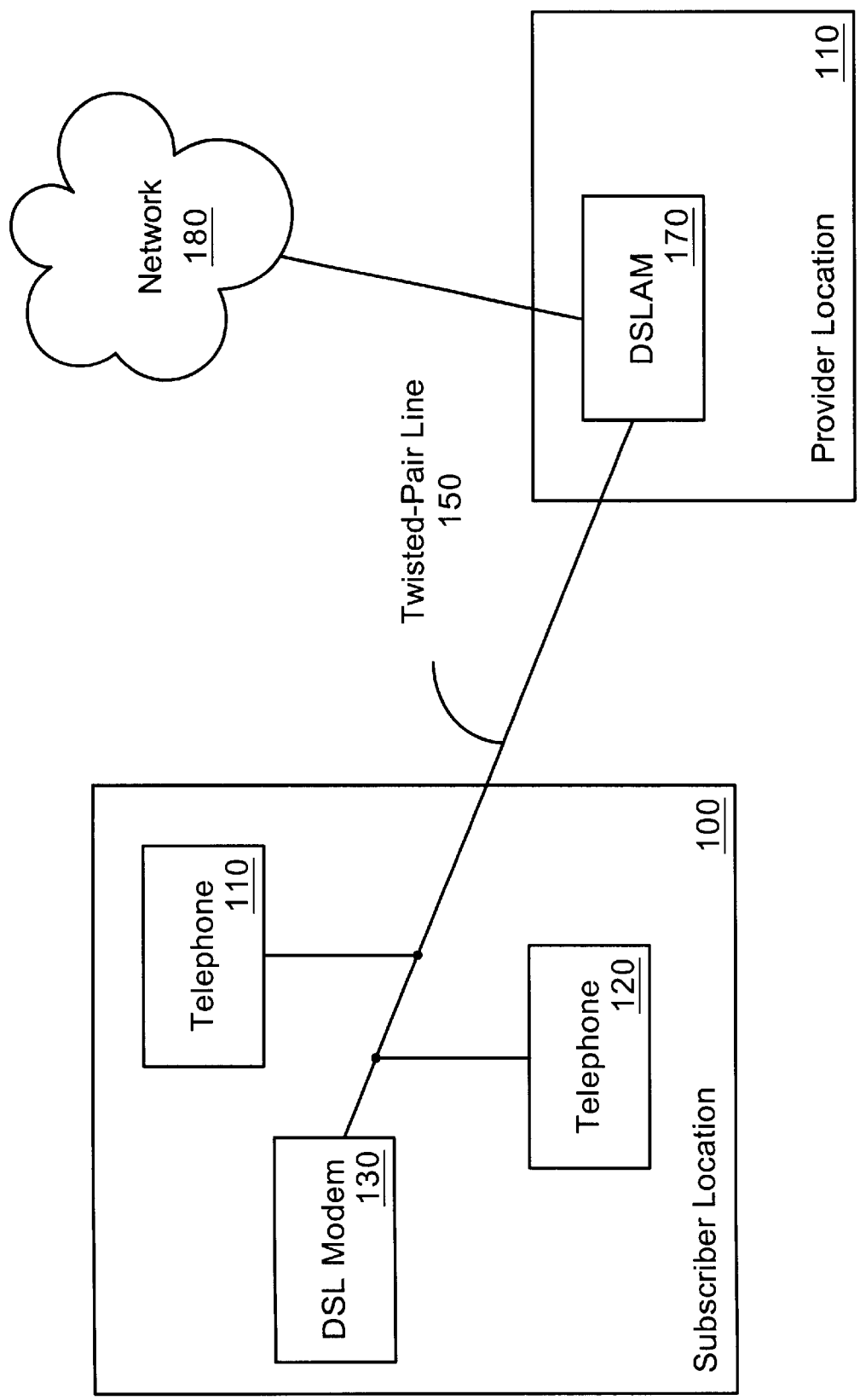
FIG. 1 is a block diagram of a subscriber location having multiple telephones and a DSL modem coupled to a digital subscriber line access multiplexer (DSLAM).

FIG. 1 is a block diagram of a subscriber location having multiple telephones and a DSL modem coupled to a digital subscriber line access multiplexer (DSLAM). Subscriber location 100 can be, for example, a residence, a business, or any location having both telephone access and network access over twisted-pair line 150. Within subscriber location telephones 110 and 120 are coupled to twisted-pair line 150. DSL modem 130 is also coupled to twisted-pair line 150.

At provider location 160, DSLAM 170 is coupled to twisted-pair line 150. DSLAM 170 is also coupled to other twisted-pair lines (not shown in FIG. 1). DSLAM 170 separates the voice frequency signals from the high-speed data traffic and controls and routes DSL traffic between end user equipment (e.g., router, modem, network interface card) and network 180. Network 180 can be any type of network, for example, the Internet or a service provider's network.

In a typical ADSL connection between subscriber location 100 and provider location 160 upstream communications are in the range of 16 kbps and 640 kbps. Downstream communications are typically in the range of 1.5 Mbps and 9 Mbps. However, any communication speeds can be supported.

Figure 2:
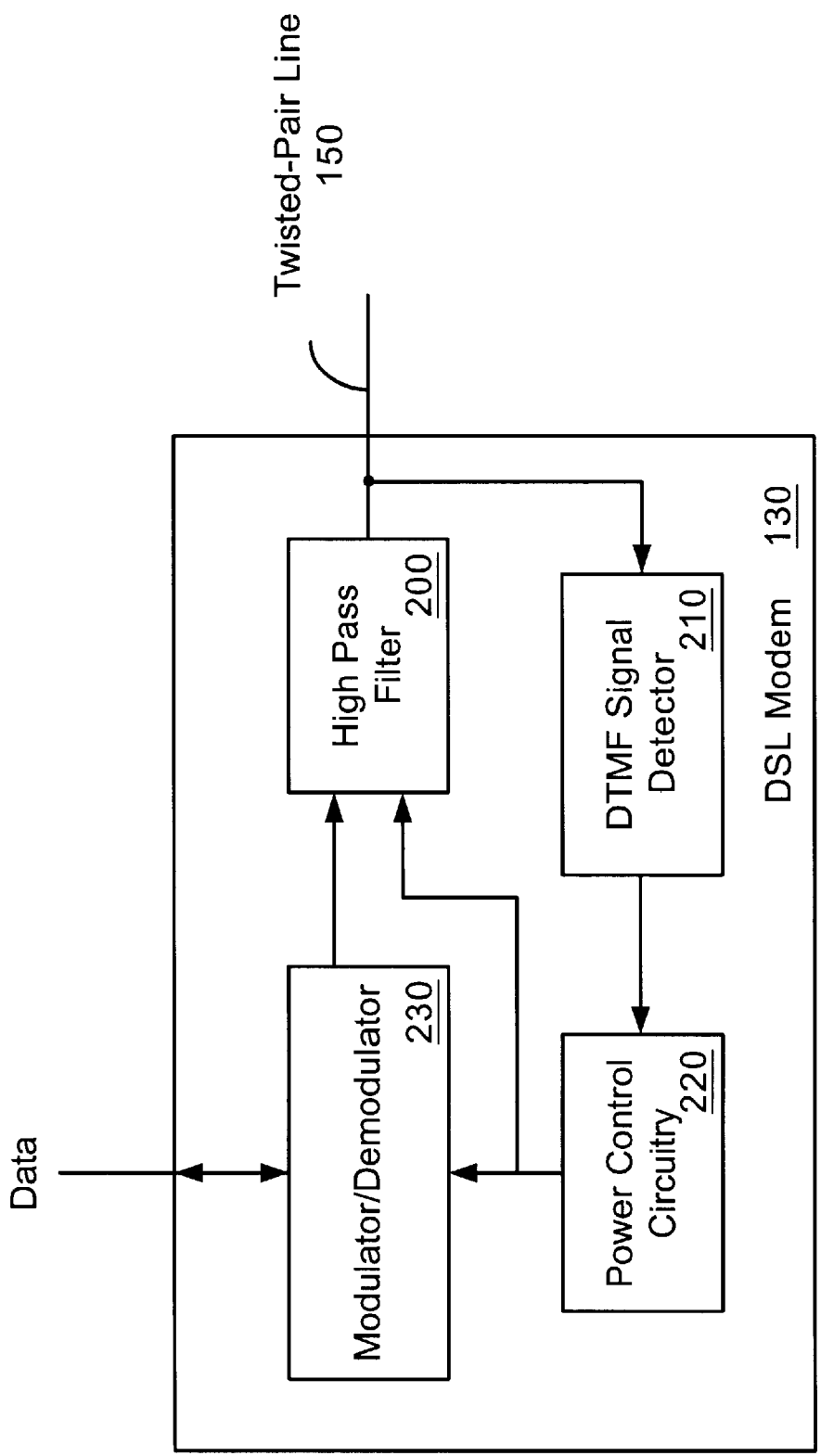
FIG. 2 is a block diagram of a DSL modem in which the power cutback of the DSL transceiver can be controlled using PSTN signaling.

FIG. 2 is a block diagram of a DSL modem in which the power cutback of the DSL transceiver can be controlled using PSTN signaling. When data is transmitted, the data is received by modulator/demodulator 230 and modulated in any manner known in the art. The level of the output signal is controlled by power control circuitry 220. The modulated data is passed through high-pass filter 200 to twisted-pair line 150. High-pass filter 200 filters out low frequency harmonics that could interfere with voice communications. In one embodiment power control circuitry 220 can also control high-pass filter 200.

When data is received, modulated data is carried over twisted-pair line 150 to high-pass filter 200. High-pass filter 200 filters out low frequency voice communications and passes high frequency data communications to modulator/ demodulator 230. The data is demodulated by modulator/demodulator 230 in any manner known in the art.

DTMF signal detector 210 is coupled to twisted-pair line 150 and detects DTMF signals on twisted-pair line 150. DTMF signal detector 210 can detect one or more DTMF signals in any manner known in the art. When one or more predetermined DTMF signals are detected by DTMF signal detector 210, and indication of the DTMF signals detected is passed to power control circuitry 220. Power control circuitry 220 determines the power level at which modulator/demodulator 230 transmits data.

In an alternate embodiment, power control circuitry 220 and/or DTMF signal detector 210 are physically separate from DSL modem 130. For example, DSL modem 130 can have a port for power cutback purposes that allows a user or technician to temporarily couple power control circuitry 220 and DTMF signal detector 210 between twisted-pair line 150 and DSL modem 130 for power cutback configuration purposes.

In one embodiment, DTMF signal detector 210 generates a first signal in response to a predetermined DTMF signal detected on twisted-pair line 150. In an alternate embodiment, DTMF signal detector 210 generates multiple signals in response to one or more DTMF signals detected on twisted-pair line 150. DTMF signal detector 210 can generate the one or more signals in any manner known in the art.

While the components of DSL modem 130 are described with respect to DTMF signals, other types of telephone-generated signals can be used in a similar manner to control power cutback of a DSL transceiver.

Power control circuitry 220 are coupled to receive the one or more signals from DTMF signal detector 210. Power control circuitry 220 generates one or more signals that are received by modulator/demodulator 230. In one embodiment, the one or more signals generated by power control circuitry 220 cause modulator/demodulator 230 to modify the power at which upstream data is transmitted. This can be either an analog or digital interface. In an alternate embodiment, the one or more signals generated by power control circuitry 220 control a filter within modulator/demodulator 230 or high-pass filter 200 directly. Other techniques for controlling upstream data transmission power levels can also be used.

Figure 3:
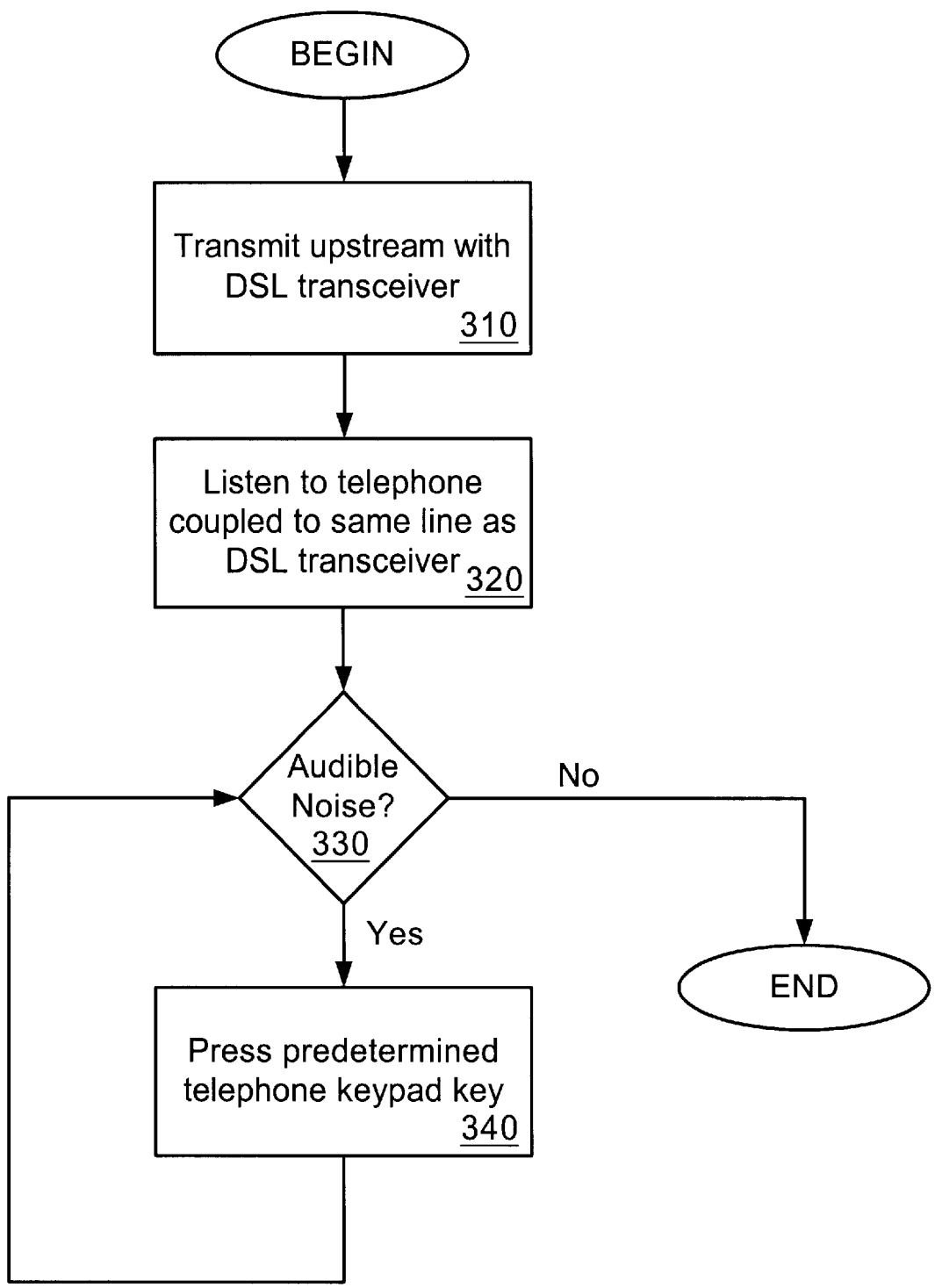
FIG. 3 is a flow diagram of a technique for power cutback of a DSL transceiver using PSTN signaling.

FIG. 3 is a flow diagram of a technique for power cutback of a DSL transceiver using PSTN signaling. The flow diagram of FIG. 3 refers only to reduction of power by the DSL transceiver. An increase in transmission power by the DSL transceiver can be accomplished in a similar manner.

Data is transmitted upstream with the DSL transceiver at 310. When modem software is installed, a power cutback file having data to be transmitted for a predetermined length of time can be provided. A file can be transferred to a service provider. Any type of data can be transferred up stream in any manner for purposes of determining the desired power cutback for the DSL transceiver.

At 320, a person configuring the power cutback of the DSL transceiver listens to a speaker of a telephone coupled to the same twisted-pair line as the DSL transceiver that is transmitting data. The person listens for noise or other interference that is caused by the DSL transceiver. Because different people have different tolerances for interference with voice communications, the power level at which interference occurs may be different for different people. Also, different telephones can cause different noise levels.

As another example, a user that is configuring the DSL transceiver can call a customer service or other telephone number. During the telephone call the user or a customer service representative can cause the DSL transceiver to transmit data upstream. When the DSL transceiver is transmitting the data, the user or the customer service representative can configure the power cutback by using DTMF signaling while the user is listening for noise on the line.

If no audible noise is detected at 330, the power level of the data transmission does not interfere with voice communications and the power level used by the DSL transceiver is acceptable. If audible noise is detected at 330, the user presses a predetermined key (e.g., 5) on the keypad of the telephone that is being used. The DTMF signal generated by pressing the key is received by the DSL modem and causes the DSL modem to transmit at a reduced power level. In one embodiment, the user repeatedly presses the key until no audible noise is detected.

The power cutback configuration process of FIG. 4 can be applied to multiple telephones coupled to the twisted-pair line on which the DSL modem is transmitting data. In one embodiment, DSL transceiver software includes a "wizard" that guides a user through the steps of configuring the DSL modem including power cutback as described above.

In the foregoing specification, the invention has been described with reference to specific embodiments thereof. It will, however, be evident that various modifications and changes can be made thereto without departing from the broader spirit and scope of the invention. The specification and drawings are, accordingly, to be regarded in an illustrative rather than a restrictive sense.

What is claimed is:

1. A method comprising:
   transmitting upstream at a first power level, with a data transmission circuit, Digital Subscriber Line (DSL) data from a predetermined file used to adjust a power level; and
   reducing the first power level to one or more available second power levels in response to one or more Dual Tone/Multiple Frequency (DTMF) signals entered during transmission of the data from the predetermined file.

2. The method of claim 1 wherein the DSL data is transmitted according to an asynchronous DSL (ADSL) protocol.

3. The method of claim 2 wherein the power level at which upstream ADSL data is transmitted is reduced in response to a DTMF signal when the data transmission circuit is in a first state and the power level at which upstream ADSL data is transmitted is not reduced in response to the DTMF signal when the data transmission is in a second state.

4. The method of claim 1 further comprising increasing the power level in response to the one or more DTMF signals.

5. The method of claim 1 wherein a DTMF signal is generated by a telephone.

6. The method of claim 1 wherein the power level is reduced in response to a remote device.

7. The method of claim 1 wherein the predetermined file is transmitted for a predetermined period of time.

8. An article comprising a electrically accessible medium having stored thereon sequences of instructions that, when executed, cause one or more electronic systems to:
   transmit upstream at a first power level, with a data transmission circuit, Digital Subscriber Line (DSL) data from a predetermined file used to adjust a power level; and reduce the first power level to one or more available second power levels in response to one or more Dual Tone/Multiple Frequency (DTMF) signals entered during transmission of the data from the predetermined file.

9. The article of claim 8 wherein the DSL data is transmitted according to an asynchronous DSL (ADSL) protocol.

10. The article of claim 9 wherein the power level at which upstream ADSL data is transmitted is reduced in response to a DTMF signal when the data transmission circuit is in a first state and the power level at which upstream ADSL data is transmitted is not reduced in response to the DTMF signal when the data transmission is in a second state.

11. The article of claim 8 further comprising increasing the power level in response to the one or more DTMF signals.

12. The article of claim 8 wherein a DTMF signal is generated by a telephone.

13. The article of claim 8 wherein the power level is reduced in response to a remote device.

14. The article of claim 8 wherein the predetermined file is transmitted for a predetermined period of time.

15. Amended) An apparatus to transmit Digital Subscriber Line (DSL) data comprising:
a transmission circuit to transmit upstream DSL data from a predetermined file used to adjust a power level over a telephone line;
a detection circuit to detect DTMF signals on the telephone line; and
a control circuit coupled to the transmission circuit and to the detection circuit to cause the transmission circuit to modify one or more available power levels at which the upstream DSL data is transmitted in response to the DTMF signals entered during transmission of the data from the predetermined file.

16. The apparatus of claim 15 wherein the DSL data is transmitted according to an asynchronous DSL (ADSL) protocol.

17. The apparatus of claim 16 wherein the power level at which upstream ADSL data is transmitted is reduced in response to a DTMF signal when the data transmission circuit is in a first state and the power level at which upstream ADSL data is transmitted is not reduced in response to the DTMF signal when the data transmission is in a second state.

18. The apparatus of claim 15 further comprising increasing the power level in response to the one or more DTMF signals.

19. The apparatus of claim 15 wherein a DTMF signal is generated by a telephone.

20. The apparatus of claim 15 wherein the predetermined file is transmitted for a predetermined period of time.

21. A method comprising:
transmitting at a predetermined power level, with a data transmission circuit, upstream Digital Subscriber Line (DSL) data from a predetermined file used to adjust a power level; and
modifying the predetermined power level to one or more available power levels in response to one or more signals generated by a telephone during transmission of the data from the predetermined file such that data is transmitted at one of the available power levels.

22. The method of claim 21 wherein the transmission power level is decreased in response to a first DTMF signal.

23. The method of claim 22 wherein the transmission power level is increased in response to a second DTMF signal.

24. The method of claim 21 wherein a signal generated by the telephone is a Dual Tone/Multiple Frequency (DTMF) signal.

25. The method of claim 21 further comprising further modifying the transmission characteristic in response to subsequent DTMF signals from a local source.

26. The method of claim 21 wherein the predetermined file is transmitted for a predetermined period of time.

27. An article comprising a machine-accessible medium to provide machine-executable instructions that, when executed, cause one or more electronic devices to:
transmit upstream Digital Subscriber Line (DSL) data from a predetermined file at a predetermined power level with a data transmission circuit; and
modify the predetermined power level to one or more available power levels in response to a signal generated by a telephone during transmission of the data from the predetermined file such that data is transmitted at one of the available power levels.

28. The article of claim 27 wherein the transmission power level is decreased in response to a first DTMF signal.

29. The article of claim 28 wherein the transmission power level is increased in response to a second DTMF signal.

30. The article of claim 27 wherein the signal generated by the telephone is a Dual Tone/Multiple Frequency (DTMF) signal.

31. The article of claim 27 further comprising sequences of instructions that, when executed, cause the one or more electronic devices to further modify the transmission characteristic in response to subsequent DTMF signals from a local source.

32. The article of claim 27 wherein the predetermined file is transmitted for a predetermined period of time.

* * * * *